US011457419B2

(12) United States Patent
Takeda et al.

(10) Patent No.: US 11,457,419 B2
(45) Date of Patent: Sep. 27, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/477,329

(22) PCT Filed: Jan. 12, 2018

(86) PCT No.: PCT/JP2018/000622
§ 371 (c)(1),
(2) Date: Jul. 11, 2019

(87) PCT Pub. No.: WO2018/131675
PCT Pub. Date: Jul. 19, 2018

(65) Prior Publication Data
US 2019/0373567 A1 Dec. 5, 2019

(30) Foreign Application Priority Data
Jan. 12, 2017 (JP) .............................. JP2017-003665

(51) Int. Cl.
*H04W 52/36* (2009.01)
*H04L 5/00* (2006.01)
(Continued)

(52) U.S. Cl.
CPC ......... *H04W 52/367* (2013.01); *H04L 5/0082* (2013.01); *H04W 52/34* (2013.01); *H04W 52/365* (2013.01); *H04W 72/0473* (2013.01)

(58) Field of Classification Search
CPC ... H04W 52/04; H04W 52/367; H04W 52/34; H04W 72/0473; H04L 5/0082
See application file for complete search history.

(56) References Cited

U.S. PATENT DOCUMENTS

| 2005/0018610 A1* | 1/2005 | Kim ...................... H04L 1/1812 370/282 |
| 2011/0230144 A1* | 9/2011 | Siomina ................ H04L 5/0048 455/68 |

(Continued)

FOREIGN PATENT DOCUMENTS

| GB | 2411078 A * | 8/2005 | .......... H04W 52/346 |
| WO | 2015/194631 A1 | 12/2015 | |

(Continued)

OTHER PUBLICATIONS

ITRI, "Discussion on CA system supporting sTTI operation", 3GPP TSG RAN WG1 Meeting #87 Reno, USA Nov. 14-18, 2016 (Year: 2016).*

(Continued)

*Primary Examiner* — Ayanah S George
(74) *Attorney, Agent, or Firm* — Osha Bergman Watanabe & Burton LLP

(57) ABSTRACT

The present invention is designed so that transmission power is controlled adequately even when communication is performed using a plurality of transmission time intervals (TTIs) of varying lengths. According to one aspect of the present invention, a user terminal has a transmission section that transmits signals using a plurality of transmission time intervals (TTIs) of varying lengths, and a control section that controls the transmission power of a first signal that is transmitted in a first TTI, and the transmission power of a second signal that is transmitted in a second TTI having a shorter TTI duration than the first TTI, and, when the total transmission power of the first signal and the second signal (Continued)

that are transmitted in an overlapping manner exceeds the maximum transmission power, the control section exerts control so that transmission power is preferentially allocated to one of the first signal and the second signal.

9 Claims, 13 Drawing Sheets

(51) Int. Cl.
*H04W 52/34* (2009.01)
*H04W 72/04* (2009.01)

(56) References Cited

U.S. PATENT DOCUMENTS

| | | | | |
|---|---|---|---|---|
| 2014/0133440 | A1* | 5/2014 | Zhang | H04L 5/0094 370/329 |
| 2017/0164299 | A1* | 6/2017 | Shimezawa | H04W 52/16 |
| 2019/0230601 | A1 | 7/2019 | Falconetti et al. | |

FOREIGN PATENT DOCUMENTS

| | | | | |
|---|---|---|---|---|
| WO | WO-2018031086 A1 * | 2/2018 | | H04B 17/318 |
| WO | 2018063071 A1 | 4/2018 | | |

OTHER PUBLICATIONS

ITRI Discussion on CA system supporting TTI operation (Year: 2016).*
International Search Report issued in PCT/JP2018/000622 dated Mar. 6, 2018 (2 pages).
Written Opinion of the International Searching Authority issued in PCT/JP2018/000622 dated Mar. 6, 2018 (4 pages).
ITRI; "Discussion on CA system supporting sTTI operation"; 3GPP TSG RAN WG1 Meeting #87, R1-1612194; Reno, USA; Nov. 14-18, 2016 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
3GPP TSG RAN WG1 Meeting #86; R1-167019 "Simultaneous Transmissions of UL Signals for Shortened TTI Operation" Nokia, Alcatel-Lucent Shanghai Bell; Gothenburg, Sweden; Aug. 22-26, 2016 (5 pages).
3GPP TSG-RAN WG1 #86 bis; R1-1610337 "UL power-related aspects for sTTI" Ericsson; Lisbon, Portugal; Oct. 10-14, 2016 (5 pages).
3GPP TSG RAN WG1 Meeting #86bis; R1-1609574 "UL simultaneous transmission between sTTI and TTI" Panasonic; Lisbon, Portugal; Oct. 10-14, 2016 (2 pages).
Extended European Search Report issued in European Application No. 18738755.0, dated Jul. 24, 2020 (9 pages).
Extended European Search Report issued in European Application No. 21155445.6, dated May 14, 2021 (10 pages).
Huawei, HiSilicon; "Details of two-level DCI schemes for short TTI"; 3GPP TSG RAN WG1 Meeting #86bis, R1-1608634; Lisbon, Portugal; Oct. 10-14, 2016 (8 pages).
Qualcomm Incorporated; "Downlink control Channel Design for Shortened TTI"; 3GPP TSG RAN WG1 #87, R1-1611638; Reno, Nevada, USA; Nov. 14-18, 2016 (9 pages).
Samsung; "sDCI for sTTI operation"; 3GPP TSG RAN WG1 Meeting #86bis, R1-1609001; Lisbon, Portugal; Oct. 10-14, 2016 (4 pages).
Office Action issued in Chinese Application No. 201880016225.2; dated Oct. 11, 2021 (16 pages).
Office Action issued in Chinese Application No. 201880016225.2; dated Apr. 24, 2022 (14 pages).
Office Action issued in Japanese Application No. 2018-561427; dated Mar. 1, 2022 (6 pages).

* cited by examiner

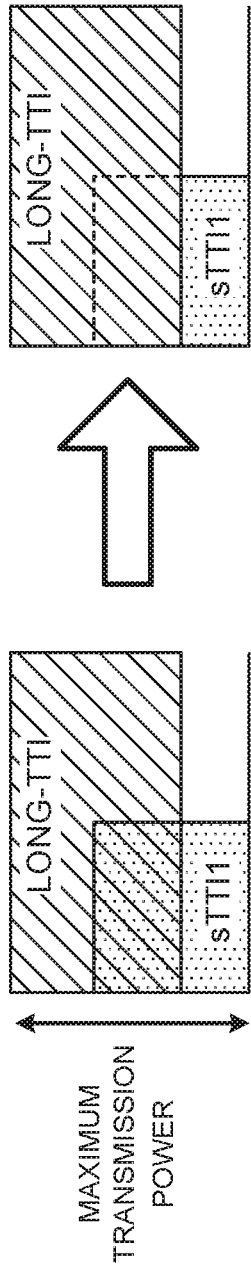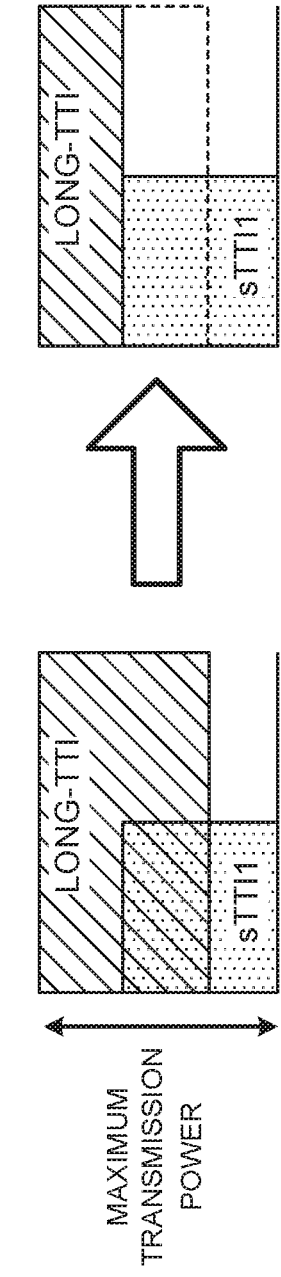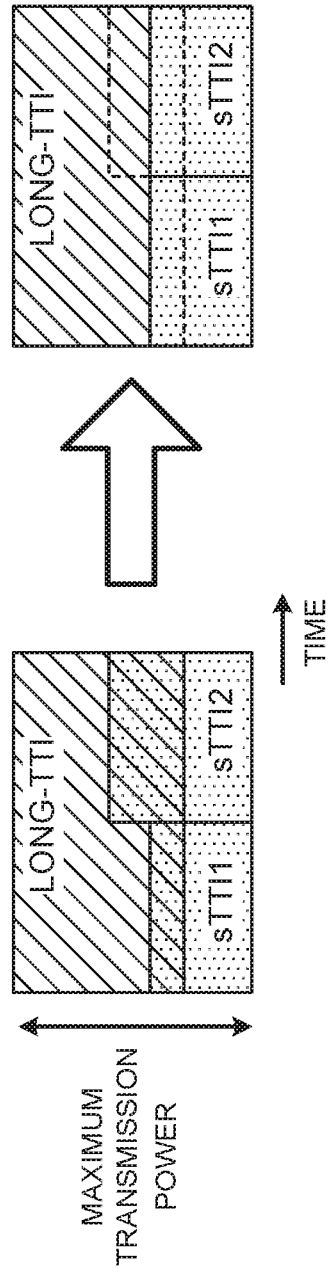

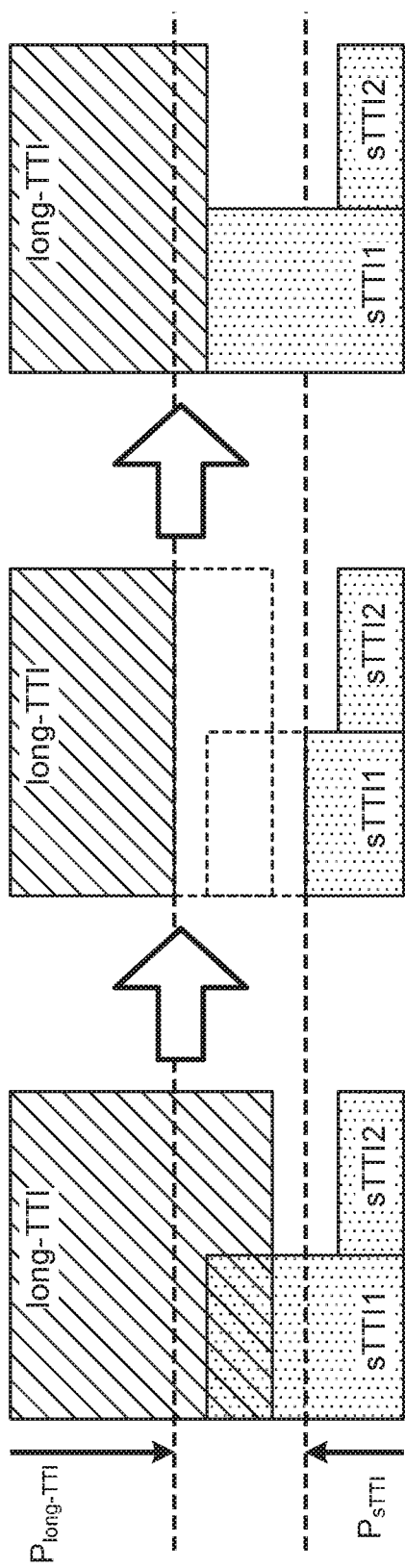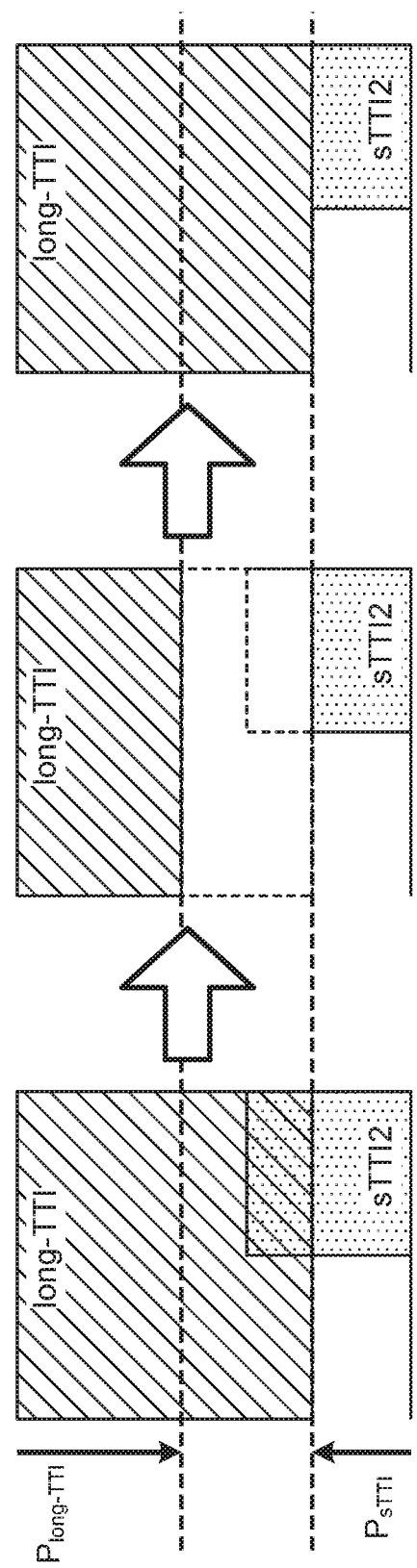

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-Advanced," "LTE Rel. 10," "LTE Rel. 11," "LTE Rel. 12," etc.) have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "5G+ (plus)," "NR (New Radio)," "Nx (New radio access)," "FX (Future generation radio access)," "LTE Rel. 13," "LTE 14" or "LTE. Rel. 15" and so on) are under study.

Carrier aggregation (CA) to integrate multiple component carriers (CC) is introduced in LTE Rel. 10/11 in order to achieve broadbandization. Each CC is configured with the system band of LTE Rel. 8 as one unit. Furthermore, in CA, a plurality of CCs of the same base station (referred to as an "eNB (evolved Node B)," a "BS (Base Station)" and so on) are configured in a user terminal (UE: User Equipment).

Meanwhile, in LTE Rel. 12, dual connectivity (DC), in which multiple cell groups (CGs) are configured in a UE, is also introduced. Each cell group is comprised of at least one cell (CC). In DC, since multiple CCs of different base stations are integrated, DC is also referred to as "inter-base-station CA (Inter-eNB CA).

Also, in LTE Rel. 8 to 12, frequency division duplex (FDD), in which downlink (DL) transmission and uplink (UL) transmission are made in different frequency bands, and time division duplex (TDD), in which DL transmission and UL transmission are switched over time and made in the same frequency band, are introduced.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Future radio communication systems (for example, 5G, NR, etc.) are expected to realize various radio communication services so as to fulfill mutually varying requirements (for example, ultra high speed, large capacity, ultra-low latency, etc.)

For example, NR is under study to provide radio communication services referred to as "eMBB (enhanced Mobile Broad Band)," "mMTC (massive Machine Type Communication)," "URLLC (Ultra Reliable and Low Latency Communications)," and so on.

Meanwhile, in LTE/NR, control of signal transmission/receipt using plurality of transmission time intervals (TTI) of varying lengths is under study. However, since, in existing LTE (for example, LTE Rel. 8 to 13), the TTI duration is fixed to 1 ms (subframe), how to control the power of UEs when signals of varying TTI durations are transmitted simultaneously is not decided yet. Unless proper power control is executed, communication throughput may be reduced, or the received quality may be deteriorated.

The present invention has been made in view of the above, and it is therefore an object of the present invention to provide a user terminal and a radio communication method, whereby transmission power can be controlled adequately even when communication is performed using a plurality of TTIs of varying lengths.

Solution to Problem

According to one aspect of the present invention, a user terminal has a transmission section that transmits signals using a plurality of transmission time intervals (TTIs) of varying lengths, and a control section that controls the transmission power of a first signal that is transmitted in a first TTI, and the transmission power of a second signal that is transmitted in a second TTI having a shorter TTI duration than the first TTI, and, when the total transmission power of the first signal and the second signal that are transmitted in an overlapping manner exceeds the maximum transmission power, the control section exerts control so that transmission power is preferentially allocated to one of the first signal and the second signal.

Advantageous Effects of Invention

According to the present invention, even when communication is performed using a plurality of TTIs of varying lengths, the transmission power can be controlled adequately.

BRIEF DESCRIPTION OF DRAWINGS

FIGS. 4A to 4C are diagrams to show examples of transmission power control based on priority rules 1 to 3, respectively; according to the first embodiment;

FIGS. 6A and 6B are diagrams to show examples of transmission power control according to a second embodiment of the present invention;

DESCRIPTION OF EMBODIMENTS

Figure 1A:
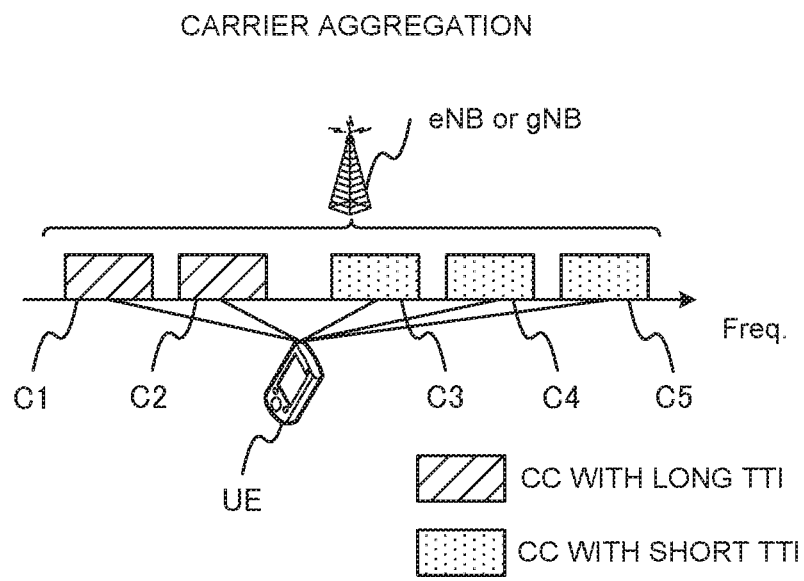
FIGS. 1A and 1B are diagrams to show examples of CCs allocated to long TTIs and short TTIs in LTE/NR.

To provide a method of reducing latency in communication in LTE, a study is presently conducted to control transmission/receipt of signals by introducing shortened TTIs (sTTIs), which have shorter durations than existing transmission time intervals (TTIs) (subframes (1 ms)). Also, in 5G/NR, a study is in progress to allow a UE to use different services simultaneously. In this case, the duration of TTIs may be changed depending on services.

Note that a TTI may represent the time unit for use when transmitting/receiving transport blocks for transmitting/receiving data, code blocks and/or codewords. Assuming that a is provided, the period of time (for example, the number of symbols) where the transport blocks, the code blocks and/or the codewords of data are actually mapped may be shorter than the TTI.

For example, when a TTI is formed with a predetermined number of symbols (for example, fourteen symbols), the transport blocks, the code blocks and/or the codewords of transmitting/receiving data can be transmitted and received in one or a predetermined number of symbol periods among these. If the number of symbols in which transport blocks, code blocks and/or codewords of transmitting/receiving data are transmitted/received is smaller than the number of symbols constituting the TTI, reference signals, control signals and so on can be mapped to symbols in the TTI where no data is mapped.

In this way, in either LTE or NR, both long TTIs and short TTIs may be used for transmission and/or receipt in UEs.

A long TTI refers to a TTI having a longer time duration than a short TTI (for example, a TTI having a time duration of 1 ms, like existing subframes) (TTIs in LTE Rel. 8 to 13)), and may be referred to as a "normal TTI (nTTI)," a "1-ms TTI," a "normal subframe," a "long subframe," a "subframe," a "slot," a "long slot," etc. Furthermore, in NR, a long TTI may be referred to as a "TTI with a lower (smaller) subcarrier spacing" (for example, 15 kHz).

A long TTI, for example, has a time duration of 1 ms, and is comprised of fourteen symbols (in the event a normal cyclic prefix (CP) is used) or comprised of twelve symbols (in the event an enhanced CP is used). A long TTI may be suitable for services that do not require strict latency reduction, such as eMBB and MTC.

In existing LTE (for example, LTE Rel. 8 to 13), channels that are transmitted and/or received in TTIs (subframes) include a downlink control channel (PDCCH: Physical Downlink Control Channel), a downlink data channel (PDSCH: Physical Downlink Shared Channel), an uplink control channel (PUCCH: Physical Uplink Control Channel), a downlink data channel (PUCCH: Physical Uplink Shared. Channel) and so on.

A short TTI refers to a TTI having a shorter time duration than a long TTI, and may be referred to as a "shortened TTI," a "partial TTI (partial or fractional TTI)," a "shortened subframe," a "partial subframe," a "minislot," a "subslot" and so on. Also in NR, a short TTI may be referred to as a "TTI with a higher (larger) subcarrier spacing (for example, 60 kHz)."

A short TTI is comprised of, for example, fewer symbols (for example, two symbols, seven symbols, and so on) than a long TTI, and the time duration of each symbol (symbol duration) may be the same as that of a long (for example, 66.7 μs). Alternatively, a short TTI may be comprised of the same number of symbols as a long TTI, and the symbol duration of each symbol may be shorter than in a long TTI.

When using short TTIs, the time margin for processing (for example, encoding, decoding, etc.) in UEs and/or base stations grows, so that the processing latency can be reduced. Also, when short TTIs are used, it is possible to increase the number of UEs that can be accommodated per unit time (for example, 1 ms). Short TTIs may be suitable for services that require strict latency reduction, such as URLLC.

A UE in which short TTIs are configured would use channels of shorter time units than existing data and control channels. In LTE and NR, for example, as shortened channels to be transmitted and/or received in short TTIs, a shortened downlink control channel (sPDCCH: shortened PDCCH), a shortened downlink data channel (sPDSCH: shortened PDSCH), a shortened uplink control channel (sPUCCH: shortened PUSCH) and a shortened downlink data channel (sPUSCH: shortened PUSCH) and so on are under research.

Note that, although examples will be shown in this specification where two short TTIs (for example, short TTI duration=seven symbols long) are included in a long TTI (for example, long TTI duration=1 ms), the format of each TTI is not limited to this. For example, long TTIs and/or short TTIs may have different time durations, and short TTIs of a plurality of short TTI durations may be used in one long TTI. Also, any number of short Ms may be contained in one long TTI.

In addition, long TTIs and short TTIs may be constituted by relatively prime numbers of symbols. For example, a long may be fourteen symbols long, and a short TTI may be three symbols long. In this case, the long TTI duration is not formed even if the short TTI of same duration is multiplied by an integer.

Now, in either LTE or NR, a UE may transmit and/or receive both long TTIs and short TTIs in one carrier, in a predetermined period.

Also, a UE that communicates using LTE and/or NR may communicate using one or more cells (or a cell group) by way of CA and/or DC. There is a possibility that TTIs of varying time durations are used (configured) per carrier.

Figure 1B:
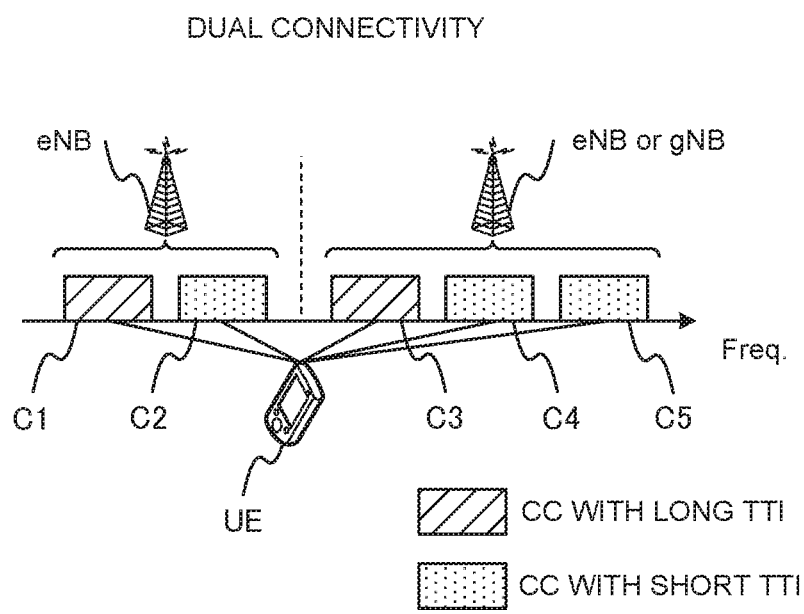

FIGS. 1A and 1B are diagrams to show examples of CCs allocated to long TTIs and short TTIs in LTE/NR. FIG. 1A shows an example in which a base station (eNB, gNB, etc.) communicates with a UE in five cells (C1 to C5) using CA. In this example, C1 and C2 are CCs that use long TTIs, and C3 to C5 are CCs that use short TTIs.

FIG. 1B shows an example in which a plurality of base stations (eNBs, gNBs, etc.) communicate with a UE in five cells (C1 to C5) using DC. In this example, the first base station (eNB) communicates with the UE in C1 where a long TTI is used, and in C2 where a short TTI is used, and the second base station (gNB) communicates with the UE in C3 where a long TTI is used, and in C4 and C5 where short TTI is are used.

Figure 2:
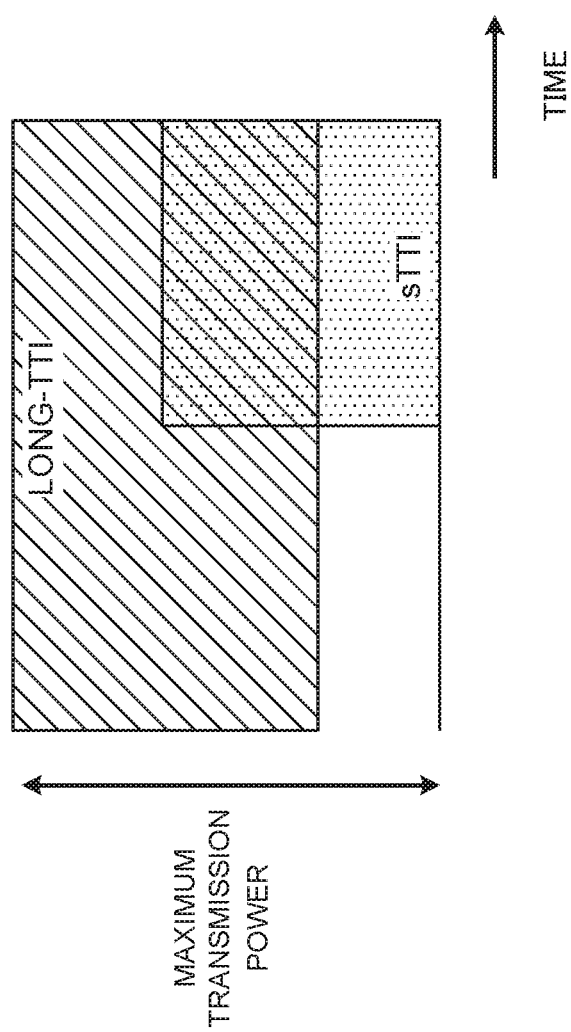
FIG. 2 is a diagram to show an example of a problem that arises when UL transmission in a long TTI and UL transmission in a short TTI that overlap each other occur.

FIG. 2 is a diagram to show an example of a problem that arises when UL transmission in a long TTI and UL transmission in a short TTI that overlap each other occur. In this example, scheduling is performed so that short TTI transmission (for example, transmission using an sPUCCH, an sPUSCH, etc.) is performed during long TTI transmission (for example, transmission using a PUCCH, a PUSCH, etc.).

In FIG. 2, in the period where long TTI transmission and short TTI transmission occur simultaneously, the sum of the power required (required power) (which may be referred to as "computed power") by the transmission signal in the long TTI and the power required by the transmission signal in the short TTI exceeds the maximum transmission power of the UE.

Here, the maximum transmission power of the UE may be referred to as "$P_{UEMAX}$," "$P_{CMAX}$," "maximum possible transmission power," "maximum allowable transmission power," and the like. Also, the maximum transmission power of the UE may be replaced by the maximum transmission power per cell (CC), $P_{CMAX,c}$. Also, the transmission power in a given TTI may be the transmission power of one CC that is transmitted using this predetermined TTI, or may be the sum of the transmission powers of a plurality of CCs.

That is, in the example of FIG. 2, simultaneous transmission of a long TTI and a short TTI produce a power limited state (a state in which the total transmission power of both TTIs exceeds the UE's maximum transmission power).

However, in existing LTE (for example, LTE Rel. 8 to 13), the TTI duration is fixed at 1 ms (subframe), and how to control the power of UEs when a power limited state occurs due to simultaneous long TTI-short TTI transmission, as described above, is not decided yet. Without proper power control, there is a risk that the throughput will be reduced or the received quality will be deteriorated.

So, the present inventors have arrived at a method of controlling transmission power adequately even when simultaneous transmission to use a plurality of TTI durations takes place. According to one aspect of the present invention, it is possible to prevent the occurrence of a power limited state due to simultaneous transmission of a long TTI and a short TTI.

Now, embodiments of the present invention will be described in detail below with reference to the accompanying drawings. Note that the radio communication methods according to the herein-contained embodiments may be used individually or may be used in combination.

Note that, in each of the following embodiments, the transmission power of a signal transmitted in a long TTI is constant during the long TTI period, and the transmission power of a signal transmitted in a short TTI is constant during the short TTI period. This is to simplify demodulation based on channel estimation, to ensure the orthogonality of signals multiplexed other UEs' signals, and so on. However, the application of the present invention is not limited to this case, and the present invention can be applied even when the transmission power of a signal transmitted in a given TTI varies within this TTI period.

(Radio Communication Method)

First Embodiment

Figure 3A:
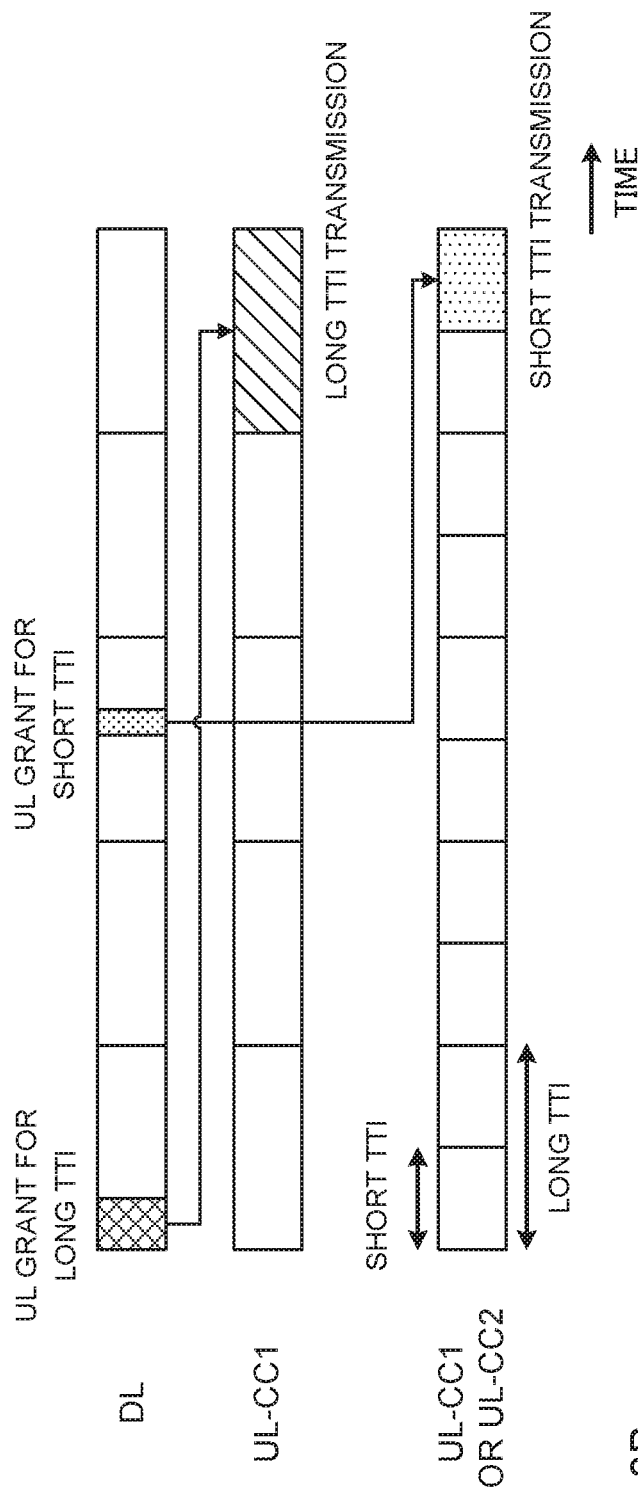
FIGS. 3A and 3B are diagrams to show examples of transmission power control according to a first embodiment of the present invention.
Figure 3B:
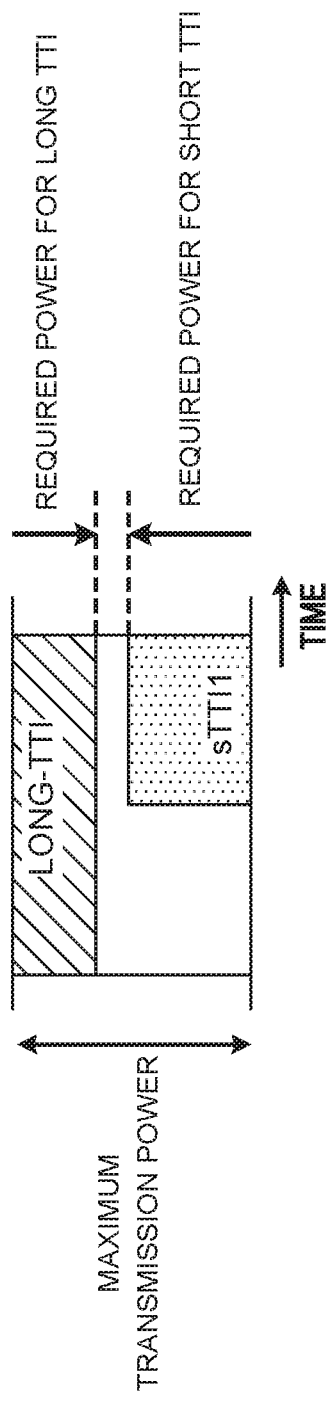

According to a first embodiment of the present invention, the minimum guaranteed power (which may be simply referred to as "guaranteed power") is not secured for transmission signals in each TTI, and the UE determines the transmission power for each TTI based on scheduling information. FIGS. 3A and 3B are diagrams to show examples of transmission power control according to the first embodiment.

Referring to 3A, the LTE calculates the transmission power for a long TTI using uplink scheduling information (also referred to as "UL grant") that is included in the long TTI's downlink control information (referred to as, for example, "DCI") and available for use. In addition, the UE calculates the transmission power for a short TTI in the period of the long TTI, by using scheduling information (UL grant) that is included in the DCI of the long TTI and available for use. DCI that schedules transmission of a long TTI may be referred to as a "UL grant for a long TTI," and DCI that schedules transmission of a short TTI may be referred to as "a UL grant for a short TTI."

Here, in the event a long TTI and short TTIs overlap each other, if the total required power does not exceed the UE's maximum transmission power (FIG. 3B), the UE may transmit signals, using the required power, in the long TTI and in all the short TTIs in the long TTI, and, otherwise, the UE may perform power-limiting control, targeting at least one signal transmitted during the long TTI period.

For example, if simultaneous transmission of a long TTI and a short TTI produces a power limited state, the UE may lower the transmission power of at least one of the TTIs (by apply power scaling), or drop the transmission power of at least one TTI. Which TTI's transmission power is to be controlled (subjected to power scaling, dropped, and so on) when a power limited state occurs may be determined based on predetermined priority rules.

For example, the priority rules may include a rule based on TTI duration. The UE may reserve the transmission power for a long TTI preferentially over the transmission power for a short TTI (also referred to as "priority rule 1"). According to priority rule 1, in the above-noted power limited state, the UE applies power scaling to the transmission power of the short TTI or drops the short TTI transmission. For example, in the above-noted power limited state, the UE may prioritize the transmission power of the PUCCH and/or the PUSCH over the transmission power of the sPUCCH and/or the sPUSCH.

Whenever simultaneous transmission of a long TTI and a short TTI occurs, the UE, complying with priority rule 1, can always prioritize the transmission power of the long TTI, so that it is possible to enhance the quality of long TTI transmission signals. By this means, for example, important signals such as L1/L2 control signals and RRC signaling can be configured, commanded or scheduled to be transmitted in long TTIs, so that the transmission power of these important signals can be red (controlled) preferentially.

The UE can reserve the transmission power for a short TTI preferentially over the transmission power for a long TTI (also referred to as "priority rule 2"), and this applies to all the short TTIs in a predetermined long TTI. In this case, in order to reserve transmission power for the second and/or subsequent short TTIs in the long TTI preferentially, look-ahead operation is required.

Whenever simultaneous transmission of a long TTI and a short TTI occurs, the UE, complying with priority rule 2, can always prioritize the transmission power of the short TTI, so that it is possible to enhance the quality of short TTI transmission signals. By this means, for example, data that requires latency reduction and/or others can be configured, commanded or scheduled to be transmitted in short TTIs, so that it is possible to preferentially reserve (control) transmission power for this data that requires latency reduction and/or others, and prevent increased latency due to detection errors, retransmissions and so on.

Here, assuming that the transmission power in a given TTI is to be determined, look-ahead operation (look-ahead power control) refers to the operation of detecting a power limited state, by taking into consideration the power required by all the TTIs that overlap (or that share a simultaneous transmission period) with this TTI, and applying power scaling/dropping when a power limited state is detected.

For example, before the UE determines the transmission power for a given long TTI, the UE checks the power required by all short TTIs that overlap the long TTI (for example, all short TTIs inside the long TTI). When so doing, the UE detects and demodulates DCI (UL grants) that commands transmission of the long TTI and all the overlapping short TTIs, and examines the situation of UL transmission (the bandwidth, the modulation scheme, the UL transmission power required based on these, and so on). The UE applies power control to the long TTI and each short TTI based on the examined result of the situation of UL transmission.

Operations that are different from look-ahead operation may include non-look-ahead operation. Non-look-ahead operation (non-look-ahead power control) refers to the kind of operation that gives priority to the transmission power of signals that are transmitted earlier. In other words, assuming that the transmission power in a predetermined TTI is to be determined, non-look-ahead operation refers to the operation of detecting a power limited state in the predetermined TTI and in TTIs that start being transmitted simultaneously with the predetermined TTI, taking into consideration the power required by the Ms that start being transmitted simultaneously with the predetermined TTI, and the transmission power of TTIs that are being transmitted, and applying power scaling/dropping when a power limited state is detected. Non-look-ahead operation imposes a lower load on the UE than look-ahead operation.

Note that the UE may confirm that long TTI transmission and/or short TTI transmission do not occur during a predetermined period based on information that is configured semi-statically (for example, by high layer signaling) (for example, information about TDD DL/UL configurations, discontinuous reception (DRX) (also referred to as "intermittent reception"), activation/deactivation, and so on). In this case, the UE does not have to reserve power for long TTIs and/or short TTIs where no transmission takes place.

If UL transmission is performed in the first short TTI in a predetermined long TTI, the UE may reserve the transmission power for this first short TTI preferentially over the transmission power for the long TTI (also referred to as "priority rule 3"). In this case, for the second and/or subsequent short TTIs in the long TTI, the UE may reserve the transmission power for the long TTI preferentially over the transmission power for these short TTIs. This control does not require look-ahead operation.

According to priority rule 3, for example, the UE gives priority to the transmission power for the sPUCCH and/or sPUSCH transmitted in the first short TTI over the transmission power of an overlapping PUCCH and/or PUSCH. In addition, the UE gives high priority to the transmission power of an overlapping PUCCH and/or PUSCH, compared to the transmission power of the sPUCCH and/or sPUSCH transmitted in the second and/or subsequent short TTIs.

In the event simultaneous long TTI-short TTI transmission occurs, the UE, following priority rule 3, can give priority to the transmission power of the first short TTI, so that the transmission power for the second and subsequent short TTIs can be made the same as the transmission power of the first short TTI at the maximum. This makes it possible to simplify the transmission power control pertaining to short TTIs, and to prevent the load on the UE from increasing.

FIGS. 4A to 4C are diagrams to show examples of transmission power control based on priority rules 1 to 3, according to the first embodiment, respectively. In FIG. 4A, the overlapping portion of the long TTI and sTTI 1 exhibit a power limited state (the left side in FIG. 4A), so that the UE maintains the transmission power for the long TTI (in other words, adjusts the transmission power of the long TTI to the required power of the long TTI), and applies power scaling to the transmission power of sTTI 1 (the right side in FIG. 4A).

In FIG. 4B, the power limited state occurs in the overlapping portion of the long TTI and sTTI 1 (the left side in FIG. 4B), so that the UE maintains the transmission power of the short TTI, and applies power scaling to the transmission power of the long TTI (the right side in FIG. 4B).

In FIG. 4C, the portion where the long TTI and sTTI 1 overlap and the portion where the long TTI and sTTI 2 overlap exhibit a power limited state (the left side in FIG. 4C). In this example, the power required by sTTI 2 is larger than the required power of sTTI 1. The UE maintains the transmission power of the first sTTI (sTTI 1) included in the long TTI, and applies power scaling to the transmission power of the long TTI (the right side in FIG. 4C). Also, the UE performs power scaling so that the transmission power of the second sTTI (sTTI2) is equal to or less than the transmission power of sTTI 1 (so that the transmission power for long TTI is maintained).

Also, the above-mentioned priority rules may include a rule based on the type of UL transmission signals (for example, the type of uplink control information (UCI)). The type of UCI may be the content of UCI that is transmitted (for example, a scheduling request (SR), retransmission control information (HARQ-ACK), periodic channel state information (P-CSI), etc.). The UE may determine the priority order of transmission power based on the types of UL transmission signals in all short TTIs included in (overlapping) a long TTI (also referred to as "priority rule 4").

For example, when a long TTI and a short TTI overlap, the UE can judge that the priority order of transmission power is a TTI transmitting a random access channel (PRACH: Physical Random Access Channel), a TTI transmitting an SR/HARQ-ACK, a TTI transmitting P-CSI, a TTI transmitting UL data, and a TTI transmitting a measurement reference signal (SRS: Sounding Reference Signal), in descending order of transmission power, regardless of TTI duration. The priority order is not limited to this.

As in the case of priority rule 2, look-ahead operation is required when reserving transmission power for the second and/or subsequent short TTIs in the long TTI preferentially.

When simultaneous long TTI-short TTI transmission occurs, the UE, following priority rule 4, can prioritize the transmission power of signals/channels that are important for communication, so that the quality of communication can be heightened. The transmission power-prioritizing control in this case does not depend on Ill duration, so that the base station scheduler can perform scheduling without considering TTI duration, which can lead to reduced processing load in scheduler control, reduced power consumption and so on.

Also, according to priority rule 4, when the type of a UL transmission signal transmitted in a long TTI and the type of a UL transmission signal transmitted in each short TTI that overlaps with the long TTI are the same, the transmission power for the short TTI may be reserved preferentially over the transmission power of the long TTI.

The UE may apply priority rule 4 only to the first short TTI in a long TTI, and apply priority rule 1 to the second and/or subsequent short TTIs in this long TTI (also referred to as "priority rule 5").

According to priority rule 5, when the type of a UL transmission signal transmitted in a long TTI and the type of a UL transmission signal transmitted in the first short TTI overlapping with the long TTI are the same, the transmission power of the short TTI may be reserved more preferentially than the transmission power of the long TTI.

When simultaneous transmission of a long TTI and a short TTI occurs, the UE, following priority rule 5, can prioritize the transmission power of signals/channels that are important for communication, in the first short TTI, so that, when an important signal/channel is transmitted in the first short TTI, the transmission power of the second and subsequent short TTIs can be the same as the transmission power of the first short TTI at a maximum. This makes it possible to simplify the transmission power control pertaining to short TTIs, and to prevent the load on UEs from increasing.

Figures 5A, 5B, 5C, 5D:
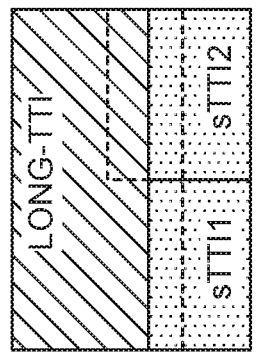
FIGS. 5A to 5D are diagrams to show examples of transmission power control based on priority rules 4 and 5, according to the first embodiment.

FIGS. 5A to 5D are diagrams to show examples of transmission power control based on priority rules 4 and 5 according to the first embodiment. FIG. 5A shows the required power of a long TTI and each sTTIs in this example, which is the same as the example on the left side of FIG. 4C.

Referring to FIG. 5A, a case will be considered here where a long TTI communicates P-CSI, sTTI 1 communicates data alone and sTTI 2 communicates an HARQ-ACK (hereinafter referred to as "case 1"). As shown in FIG. 5B, the UE, following priority rule 4, gives the highest priority to sTTI 2 where an HARQ-ACK is communicated, and maintains the transmission power, during the period of this long TTI. Consequently, power scaling is applied to the transmission power of the long TTI overlapping sTTI 2. Also, although the priority of sTTI 1 is lower than that of the long TTI the transmission power of sTTI 1 is maintained because power scaling is applied to the transmission power of long TTI.

Also, in case 1, as shown in FIG. 5C, the UE, following priority rule 5, prioritizes the transmission power of the long TTI that transmits P-CSI, over the transmission power of sTTI 1 that transmitting data alone. Consequently, the transmission power of sTTI 1 is subjected to power scaling. Also, since sTTI 2 has no priority over the long TTI, the transmission power of sTTI 2 is made the same as the transmission power of sTTI 1 by way of power scaling.

Now, referring to FIG. 5A, a case will be considered here where a long TTI, sTTI 1 and sTTI 2 each communicate an HARQ-ACK (hereinafter referred to as "case 2"). As shown in FIG. 5B, in the long TTI period, since the type of the UL transmission signal is the same in all of the long TTI and the short TTIs, the UE, following priority rule 4, maintains the transmission power of sTTI 1 and sTTI 2 preferentially over the long TTI. Consequently, power scaling is applied to the transmission power of the long TTI so that the transmission power of sTTI 2, which is the short TTI having the higher transmission power, is maintained.

Also, in case 2, as shown in FIG. 5D, the UE, following priority rule 5, prioritizes the transmission power of sTTI 1 over the transmission power of the long TTI where the type of the UL transmission signal is the same. For this reason, power scaling is applied to the transmission power of the long TTI so that the transmission power of sTTI 1 is maintained. Also, since sTTI 2 has no priority over the long TTI the transmission power of sTTI 2 is made the same as the transmission power of sTTI 1 by way of power scaling.

Information about the priority rules may be reported (configured, commanded, etc.) to UEs, or may be set forth in the specification. Information about the priority rules may be reported to UEs via higher layer signaling (for example, RRC (Radio Resource Control) signaling, MAC (Medium Access Control) signaling, broadcast information (the MIB (Master Information Block), SIBs (System Information Blocks), etc.), physical layer signaling (for example, DCI), or a combination of these.

The information about the priority rules may be provided in the form of indices that correspond to above-mentioned priority rules 1 to 5. In addition, the information about the priority rules may be information related to power control mode, and include, for example, information as to whether or not the above-described look-ahead operation or non-look-ahead operation is applicable (enabled/disabled), information as to which of look-ahead operation and non-look-ahead operation is applied, and so on.

Furthermore, the information about the priority rules may be information as to whether or not the transmission power of a long TTI is prioritized over the transmission power of a short TTI, or information about the order of priority of the type of UL transmission signal.

Note that control not conforming to the priority rules may be executed at least for some of the signals/channels. For example, even if priority rule 2 is configured in a UE, control may be exerted so that, when the PRACH is transmitted in a long TTI, the transmission power of the PRACH is prioritized over the transmission power of short TTIs, irrespective of the priority rule.

As explained above, according to the first embodiment, it is possible to prevent occurrence of a power limited state due to simultaneous long TTI-short TTI transmission.

Alternative Example of First Embodiment

Note that, in the first embodiment, scheduling information for short TTIs may be divided into a plurality of DCIS and transmitted. In this case, hierarchical DCI (multi-level DCI) may be used.

For example, first-level DCI, including some or all of the basic scheduling information (resource allocation information, initial MCS, TPC command, etc. may be transmitted every long TTI (for example, every subframe).

Also, second-level DCI, including some or all of additional scheduling information and/or adjustment information (MCS offset, TPC command offset, etc.), may be transmitted every short TTI (for example, every sTTI).

The UE may calculate transmission power for long TTIs and all sTTIs included in a predetermined long TTI at the same time. In addition, the UE may calculate power headroom reports (PHRs) for long TTIs and all sTTIs included in a predetermined long TTI. That is, power calculation and/or PHR calculation, whether for long TTIs or for short TTIs, may be performed every long TTI (for example, 1 ms).

Note that a PHR is a report which a UE feeds back to a device on the network side (for example, a base station), and includes information about the uplink power headroom (PH)

for each serving cell. The base station can control uplink transmission power of the UE, dynamically, based on PHRs reported from the UE.

In existing LTE (for example, LTE Rel. 13), the UE transmits a PHR via MAC signaling using the PUSCH. To be more specific, a PHR is constituted by PHR MAC CEs (Control Elements) contained in MAC PDU (Protocol Data Unit).

Currently, two types of PHs (type 1 PH and type 2 PH) are specified. Type 1 PH is a PH that takes only the power of the PUSCH into account, and Type 2 PH is a PH that takes both the power of the PUSCH and the power of the PUCCH into account. Note that PH information may be a value (or the level) of PH, or may be an index that is associated with a value of PH.

The UE may calculate transmission power and/or PHRs for all short TTIs that are included in (that overlap with) a predetermined long using scheduling information (DCI) that is included in first-level DCI and available for use. In this case, the UE may or may not assume that the scheduling information is adjusted based on second-level DCI. That is, the UE may calculate transmission power and/or PHRs for short TTI using both first-level DCI and second-level DCI, or calculate transmission power and/or PHRs for short TTIs using only first-level DCI.

If both first-level DCI and second-level DCI are used to calculate transmission power and/or PHRs for short TTIs, the base station can have more precise transmission power information using values reported to the base station, and perform more suitable uplink scheduling and transmission power control after that. If transmission power and/or PHRs for short TTIs are calculated using first-level DCI alone, the UE calculates PHRs and place the results in MAC CEs less frequently, so that the processing burden on the UE can be reduced, and the battery consumption can be reduced.

The UE may calculate transmission power and/or PHRs for long TTIs using scheduling information (DCI) that is included in conventional DCI (DCI that is not divided) and available for use.

As explained above, an alternative example of the first embodiment uses multi-level DCI, so that, for example, transmission power calculation and/or PHR calculation can be performed adequately for each long TTI period.

Second Embodiment

According to a second embodiment of the present invention, the minimum guaranteed power is configured for a UE on a semi-static basis, and the UE determines the transmission power of each TTI based on scheduling information and the minimum guaranteed power that is configured.

According to a second embodiment, one or both of the minimum guaranteed power for long TTIs (which may be hereinafter referred to as, for example, "$P_{long\text{-}TTI}$") and the minimum guaranteed power for short Ms (which may be hereinafter referred to as, for example, "$P_{sTTI}$") are configured in a UE by, for example, higher layer signaling. Each minimum guaranteed power may be the absolute value of the power, or may be a relative value. When long TTI transmission and short TTI transmission occur in the same carrier (or cell, CC, etc.), these minimum guaranteed powers are configured in this carrier (or cell, CC, etc.), and, when long TTI transmission and short TTI transmission occur in different carriers (or cells, CCs, etc.), these minimum guaranteed powers are configured for each carrier (or cell, CC, etc.).

For example, each minimum guaranteed power may be defined as the ratio (for example, percentage) of the minimum guaranteed power to the maximum transmission power of the UE. In this case, the minimum guaranteed power for long TTIs and the minimum guaranteed power for short TTIs may each be configured with a value between 0 and 100(%). The sum of the minimum guaranteed power for long TTIs and the minimum guaranteed power for short TTIs is preferably a value between 0 and 100(%).

According to the second embodiment, the UE determine the transmission power for a long TTI and/or a short TTI where transmission is scheduled, by using scheduling information (DCI) that is available for use and the minimum guaranteed power.

First, the UE allocates the power ($P_{pre\_xTTI}$) determined by following equation 1 to the long TTI and/or the short TTI. As can be seen from equation 1, this power is the minimum value of the power based on DCI (for example, the required power calculated from the actual grant (or assignment) and the TPC command) and the minimum guaranteed power of xTTI (long TTI or sTTI).

$$P_{pre\_xTTI} = \min(\text{the power of } xTTI \text{ based on } DCI \text{ or } P_{xTTI}) \quad \text{(Equation 1)}$$

When xTTI is an sTTI, in equation 1, the power of the sTTI based on DCI may be the maximum required power among the required powers of a plurality of sTTIs that overlap with the long TTI.

By assigning $P_{pre\_xTTI}$ first, the UE can reserve minimum guaranteed power for each xTTI.

Next, the UE assigns the remaining power (which corresponds to $P_{CMAX}$-$P_{pre\_long\text{-}TTI}$-$P_{pre\_sTTI}$, for example), if any, as each xTTI's transmission power. If the long TTI and the short TTI overlap and the sum of the required powers of both does not exceed the maximum transmission power of the UE, both transmission powers may be the respective required powers. If the sum of the required powers of both exceeds the maximum transmission power of the UE, the UE may apply the power-limiting control described with the first embodiment. In the same way as in the first embodiment, information about the priority rules may be reported to the UE, or may be set forth in the specification.

FIGS. 6A and 6B are diagrams to show examples of transmission power control according to the second embodiment. In FIG. 6, it is assumed that the UE uses priority rule 3.

In FIG. 6A, since the required power of the long TTI exceeds $P_{long\text{-}TTI}$ and the required power of sTTI 1 exceeds $P_{sTTI}$ (the left part in FIG. 6A), the UE first allocates the minimum guaranteed power to each (the center part in FIG. 6A). Next, the UE preferentially assigns the remaining power in the long TTI period to sTTI 1 based on priority rule 3 (the right part in FIG. 6A), The transmission power of the long TTI is the power obtained by subtracting the required power of sTTI 1 from the maximum transmission power of the UE. The required power of sTTI 2 is less than $P_{sTTI}$, so that this power is simply allocated.

In FIG. 6B, since the required power of the long TTI exceeds $P_{long\text{-}TTI}$ and the required power of sTTI 2 exceeds $P_{sTTI}$ (the left part in FIG. 6B), the UE first assigns the minimum guaranteed power to each (the center part in FIG. 6B). Next, the UE preferentially assigns the remaining power in the long TTI period to the long TTI based on priority rule 3 (the right part in FIG. 6B), Here, since there is no power remaining, the transmission power of sTTI 2 is $P_{sTTI}$.

Figure 7A:
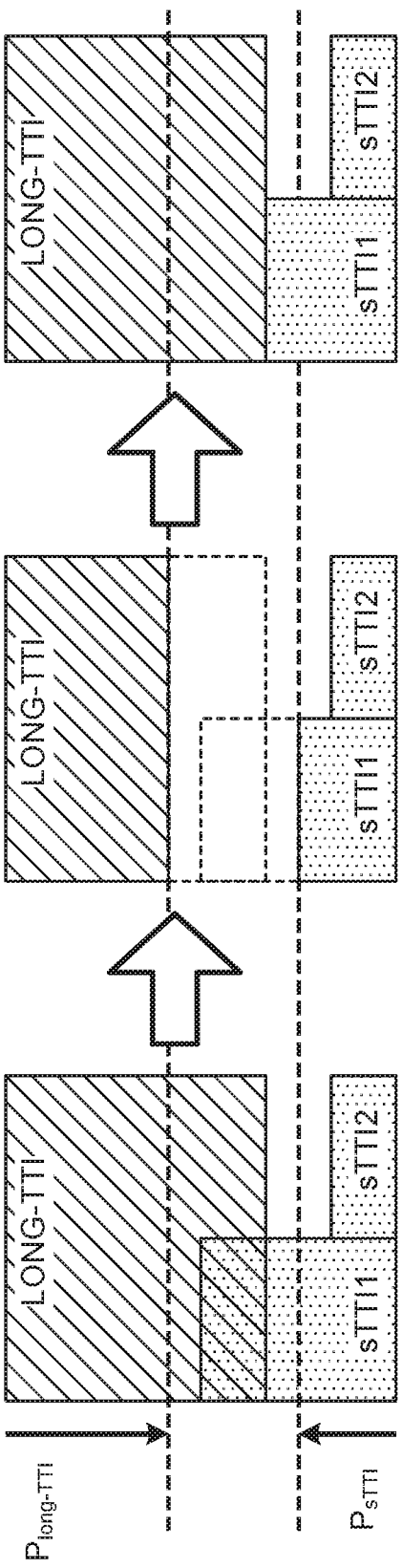
FIGS. 7A and 7B are diagrams to show other example of transmission power control according to the second embodiment.
Figure 7B:
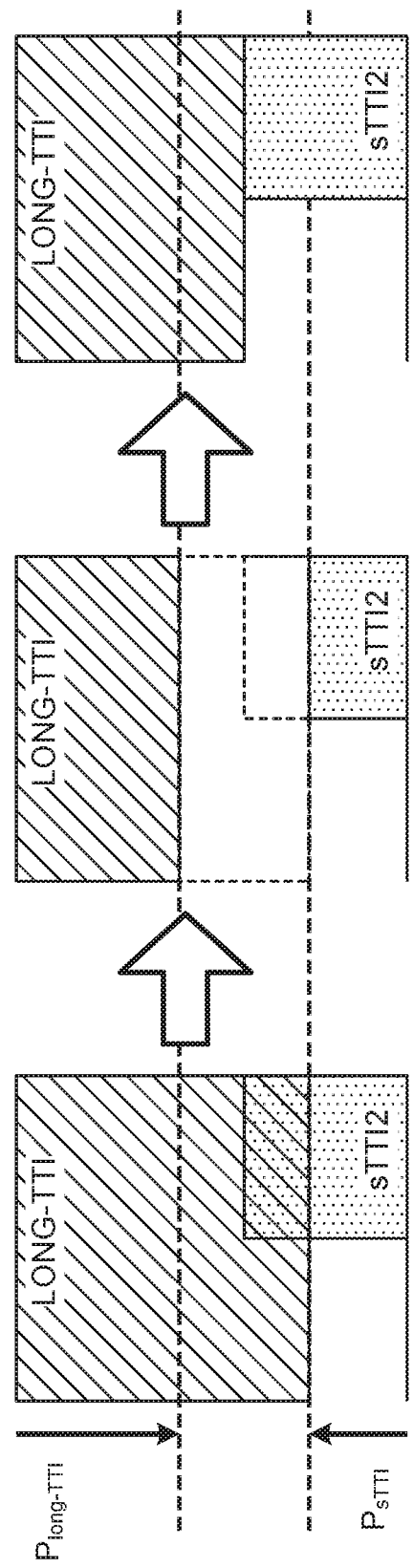

FIGS. 7A and 7B are diagrams to show other examples of transmission power control according to the second embodiment. In FIG. 7, it is assumed that the UE uses priority rule 4. FIG. 7A shows a case where a long TTI communicates an HARQ-ACK and an sTTI communicates data alone. FIG. 7B shows a case where an sTTI communicates an HARQ-ACK and a long TTI communicates P-CSI. Furthermore, the examples shown in FIGS. 7A and 7B are the same as FIGS. 6A and 6B, except for these conditions.

In FIG. 7A, the UE assigns the minimum guaranteed power to the long TTI and sTTI 1 (the center part in FIG. 7A), and, following this, the UE preferentially assigns the remaining power in the long TTI period to the long TTI according to priority rule 4 (the right part in FIG. 7A). The transmission power of sTTI 1 is the power obtained by subtracting the required power of the long TTI from the maximum transmission power of the UE. The required power of sTTI 2 is less than $P_{sTTI}$, so that this power is simply allocated.

In FIG. 7B, the UE assigns the minimum guaranteed power to the long TTI and sTTI 2 (the center part in FIG. 7B), and, following this, subsequently, the UE preferentially allocates the remaining power in the long TTI period to sTTI 2 according to priority rule 4 (the right part in FIG. 7B). The transmission power of the long TTI is the power obtained by subtracting the required power of sTTI 2 from the maximum transmission power of the UE.

As explained above, according to the second embodiment, it is possible to reserve the minimum guaranteed power of each TTI while preventing occurrence of a power limited state due to simultaneous long TTI-short TTI transmission.

Third Embodiment

According to a third embodiment of the present invention, the minimum guaranteed power is reserved for a UE on a dynamic basis, and the UE determines the transmission power of each TTI based on scheduling information and the minimum guaranteed power calculated by the UE.

The third embodiment presupposes using hierarchical DCI, as described above with the alternative example of the first embodiment (for example, two levels of DCI).

For example, first-level DCI, including some or all of the basic scheduling information (resource allocation information, initial MCS, TPC command, etc.) may be transmitted every long TTI (for example, every subframe).

Also, second-level DCI, including some or all of additional scheduling information and/or adjustment information (MCS offset, TPC command offset, etc.) may be transmitted every short TTI (for example, every sTTI).

In the third embodiment, the UE determines (calculates) one or both of the minimum guaranteed power for long TTIs ($P_{long\text{-}TTI}$) and the minimum guaranteed power ($P_{sTTI}$) for short TTIs.

The UE may calculate the minimum guaranteed power for all short TTIs in a predetermined long TTI (for example, a subframe) using scheduling information (DCI) that is included in first-level DCI and available for use. In this case, the UE may or may not assume that the scheduling information is adjusted based on second-level DCI (for example, the UE may assume that the MCS offset and/or the TPC command offset is 0).

The UE may calculate the minimum guaranteed power for long TTIs using scheduling information (DCI) that is included in conventional DCI and available for use.

The UE determines the transmission power for a long TTI and/or a short TTI where transmission is scheduled, by using the available scheduling information (DCI) and the calculated minimum guaranteed power. Since the subsequent processes (calculation of $P_{pre\_xTTI}$, power control when a power limited state is produced, etc.) may be the same as the processes in the second embodiment, the description will be omitted.

As explained above, according to the third embodiment, it is possible to reserve the minimum guaranteed power of each TTI while preventing occurrence of a power limited state due to simultaneous long TTI-short TTI transmission. Also, since the minimum guaranteed power is controlled dynamically, flexible transmission power control becomes possible.

Fourth Embodiment

With the first to the third embodiment, transmission power control for use in the event UL transmissions in a long TTI and a short TTI overlap has been described. Now, with a fourth embodiment of the present invention, PHR calculation (calculation of PHs included in PHRs) for use when UL transmissions in a long TTI and a short TTI overlap will be described.

PHRs in existing LTE are calculated in subframe units. Consequently, existing PHR calculation methods cannot take sTTI transmission into consideration in a relevant manner. That is to say, how to calculate PHRs when a UE makes transmissions in the sPUSCH and/or the sPUCCH needs to be discussed. The fourth embodiment relates to PHR calculation for use in this case.

According to the fourth embodiment, the UE judges the method of calculating the PH to be included in a PHR based on the TTI duration that is used when transmitting the PHR. In other words, the UE may judge the PH to include in a PHR based on the type (PUSCH or sPUSCH) of the uplink shared channel that is used to transmit the PHR.

For example, when a PHR is transmitted in the sPUSCH, this PHR may include a PH that is associated with the sPUCCH. For example, when the UE supports simultaneous transmission of an sPUCCH and an sPUSCH, and, furthermore, higher layer signaling (for example, RRC signaling) that enables this simultaneous transmission is reported, if there is no sPUCCH transmission, the UE preferably calculates a virtual PH (VPH) for the sPUCCH.

In the event the above simultaneous transmission is enabled, if there is sPUCCH is transmission, the UE preferably calculates the real PH (RPH) of the sPUCCH transmitted in the same period.

Note that the real PH of a predetermined channel is a PH that takes into account the actual transmission power (for example, the transmission bandwidth) in the predetermined channel, a virtual PH of a predetermined channel is a PH that is calculated on the assumption that there is no transmission in this predetermined channel (for example, a PH independent of the PUSCH/sPUSCH bandwidth, a PH that ignores (or that is calculated without using) some of the parameters used for PUCCH/sPUCCH transmission power, etc.). A PHR to include a real PH may be referred to as a "real PHR," and a PHR to include a virtual PHR may be referred to as a "virtual PHR."

On the other hand, if the UE does not support simultaneous transmission of an sPUCCH and an sPUSCH, or if high layer signaling that disables this simultaneous transmission is reported, the UE may not calculate the PH of the sPUCCH.

Also, when a PHR is transmitted in the sPUSCH, the PHR may include a PH for the PUSCH and/or the PUCCH of the long TTI in the same period (and/or the PUSCH of a longer TTI than the long TTI). In this case, the UE may calculate a virtual PH and/or a real PH of the PUCCH and/or the PUSCH using the same method as the PH calculation method for the PUCCH and/or the PUSCH in existing LTE.

When a PHR is transmitted in the PUSCH of the long TTI, the PHR may include a PH related to a predetermined sTTI (for example, the first sTTI) included in the long TTI.

Here, when the sPUSCH alone is transmitted in a predetermined sTTI, the UE may calculate a real PH of the sPUSCH and a virtual PH of the sPUCCH. Also, if the sPUCCH alone is transmitted in a predetermined sTTI, the UE may calculate a real PH of the sPUCCH and a virtual PH of the sPUSCH. Also, when both the sPUSCH and the sPUCCH are transmitted in a predetermined sTTI, the UE may calculate a real PH of the sPUCCH and a real PH of the sPUSCH. Furthermore, if neither the sPUSCH nor the sPUCCH is transmitted in a predetermined sTTI, the UE may calculate a virtual PH of the sPUCCH and a virtual PH of the sPUSCH.

The UE may judge what is transmitted in a given sTTI based on higher layer signaling (for example, RRC signaling), such as (1) to (5) below: (1) Higher layer signaling that enables simultaneous transmission of an sPUCCH and an sPUSCH; (2) Higher layer signaling that enables simultaneous transmission of an sPUCCH and a PUSCH; (3) Higher layer signaling for enabling simultaneous transmission of an sPUCCH and a PUCCH; (4) Higher layer signaling for enabling simultaneous transmission of an sPUSCH and a PUSCH; and (5) Higher layer signaling that enables simultaneous transmission of an sPUSCH and a PUCCH.

Also; when a PHR is transmitted in the long TTI PUSCH, the UE may not calculate the PHs of sTTIs included in (and/or overlapping) this long TTI. In this case, while the PUSCH of TTI #n, which is scheduled by the UL grant in TTI #n-k, is encoded, the UE does not have to predict (or worry about) whether an sPUCCH and/or an sPUSCH is present in sTTI #m in TTI #n.

Also, when a PHR is transmitted in the long TTI PUSCH, the UE may calculate the PHs of all the sTTIs included in (and/or overlapping) the long TTI or the PHs of x sTTIs from the top (where x is, for example, a number smaller than the total number of sTTIs in the long TTI). For example, if the sill duration is two OFDM (Orthogonal Frequency Division Multiplexing) symbols, seven sills may be included in one subframe, and, if the sTTI duration is seven OFDM symbols, two sTTIs may be included in one subframe.

As explained above, according to the fourth embodiment, even when simultaneous long TTI-short TTI transmission occurs, it is still possible to calculate an appropriate PHs and send PHR reports.

(Radio Communication System)

Now, the structure of the radio communication system according to one embodiment of the present invention will be described below. In this radio communication system, communication is performed using one of the radio communication methods according to the herein-contained embodiments of the present invention, or a combination of these.

Figure 8:
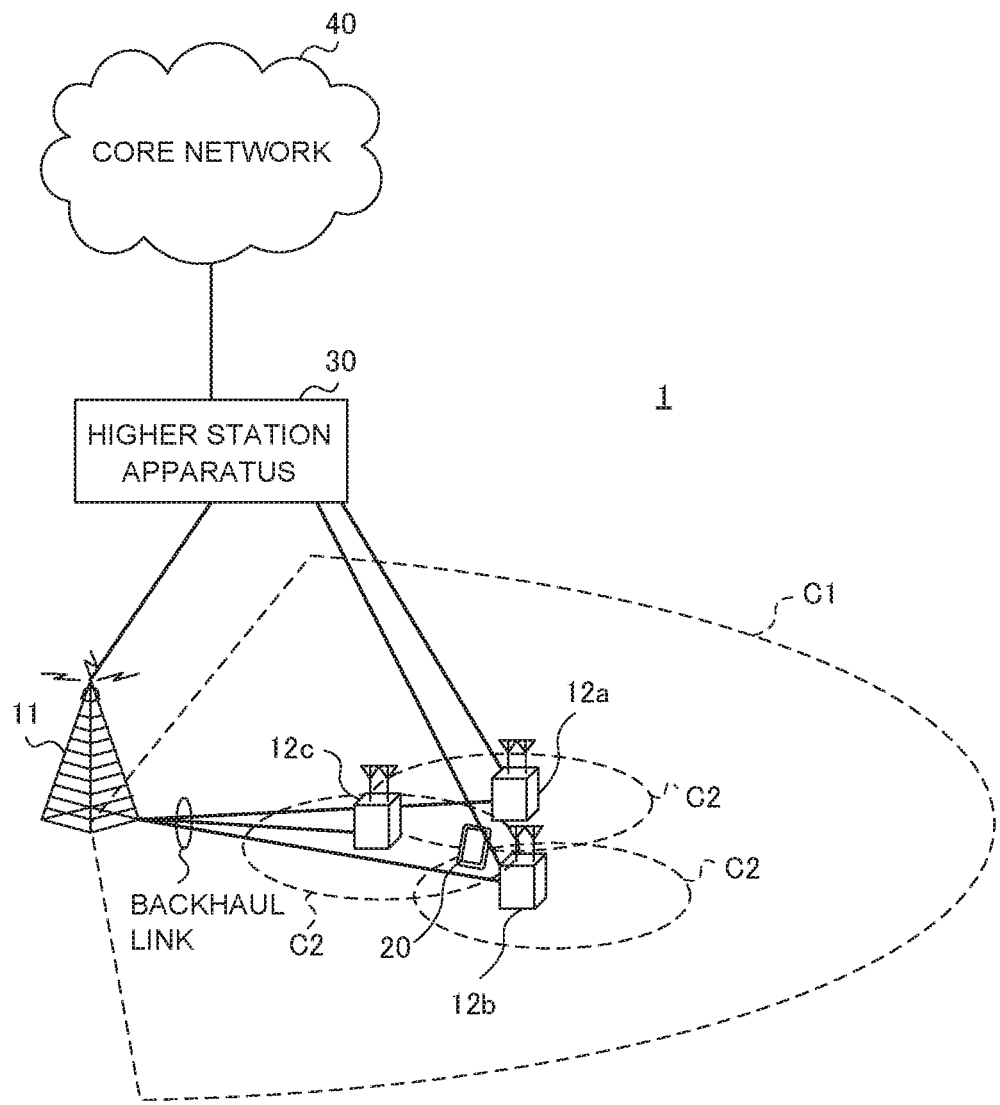
FIG. 8 is a diagram to show an example of a schematic structure of a radio communication system according to one embodiment of the present invention.

FIG. 8 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. The arrangements and numbers of cells and user terminals 20 are not limited to those illustrated in the drawing.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that, uplink and downlink radio access schemes are not limited to these combinations, and other radio access schemes may be used.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information SIBs (System Information Blocks) and so on are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARCS Indicator CHannel) and so on. Downlink control information (DC which includes PDSCH and/or PUSCH scheduling information, is communicated by the PDCCH.

Note that scheduling information may be reported in DCI. For example, DCI to schedule receipt of DL data may be referred to as a "DL assignment," and DCI to schedule UL data transmission may also be referred to as a "UL grant."

The number of OFDM symbols to use for the PDCCH is communicated by the PCFICH. HARQ (Hybrid. Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data, higher layer control information and so on are communicated by the PUSCH. Also, in the PUCCH, downlink radio quality information (CQI: Channel Quality Indicator), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs: Sounding Reference Signals), demodulation reference signals (DMRSs) and so on are communicated as uplink reference signals. Note that the DMRSs may be referred to as "user terminal-specific reference signals (UE-specific reference signals). Also, the reference signals to be communicated are by no means limited to these.

(Radio Base Station)

Figure 9:
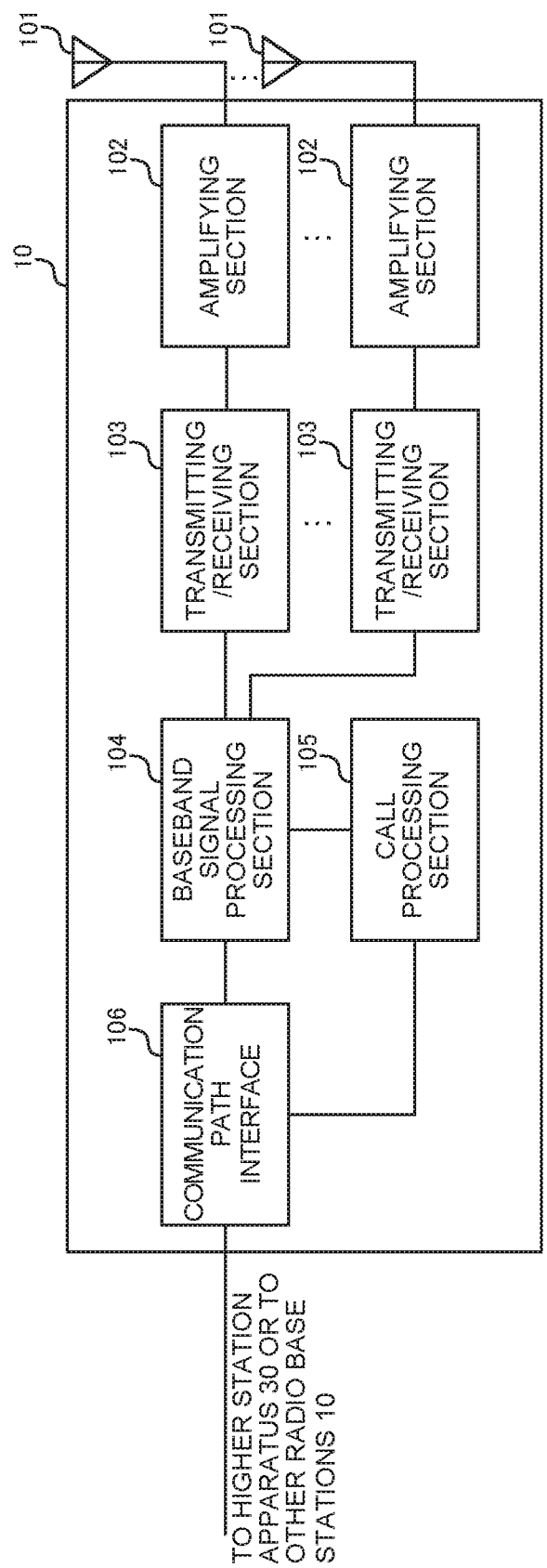
FIG. 9 is a diagram to show an example of an overall structure of a radio base station according to one embodiment of the present invention.

FIG. 9 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a preceding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 may transmit and/or receive signals using multiple TTIs of varying lengths (TTI durations). For example, in one or more carriers (cells, CCs, etc.), the transmitting/receiving sections 103 may receive signals using a first TTI (for example, a long TTI) and a second TTI (for example, a short TTI) with a shorter TTI duration than the first TTI.

For example, the transmitting/receiving sections 103 receive uplink signals transmitted from the user terminal 20 using the PUCCH, the PUSCH, the sPUCCH, the sPUSCH and/or others. Also, the transmitting/receiving sections 103 receive power headroom reports (PHRs), which include power headrooms (PHs) relating to one or more long TTIs and short TTIs. The transmitting/receiving sections 103 may transmit at least one of information related to priority rules, information related to the minimum guaranteed power of predetermined TTIs, information related to PHR calculation, and information related to PHR transmission timing, to the user terminal 20.

Figure 10:
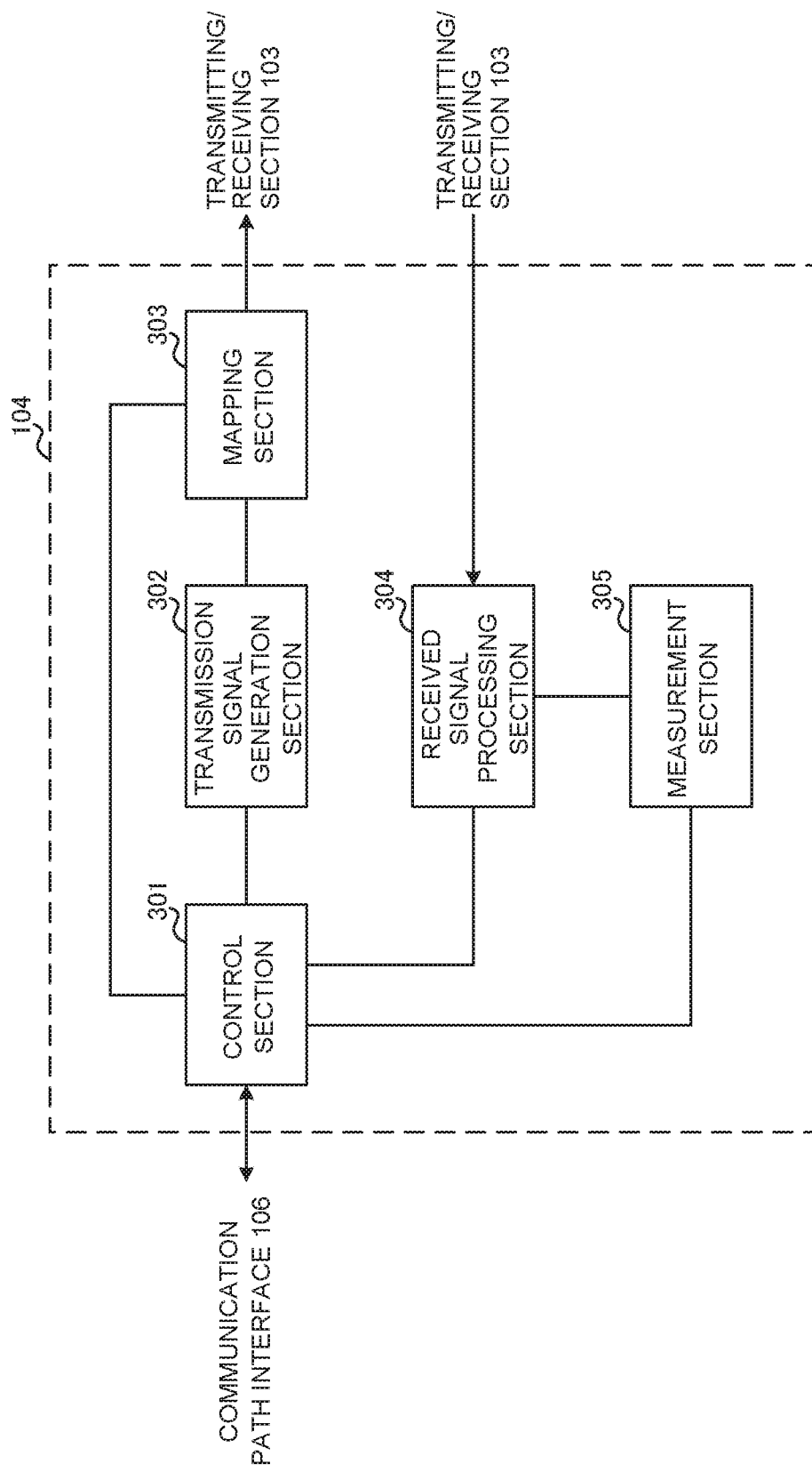
FIG. 10 is a diagram to show an example of a functional structure of a radio base station according to one embodiment of the present invention.

FIG. 10 is a diagram to show an example of a functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgement information). Also, the control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

The control section 301 also controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), uplink reference signals, and/or other signals.

The control section 301 controls the transmission and/or reception of signals in one or more CCs by using a first TTI (for example, a long TTI, a subframe, a slot, etc.) and a second TTI (for example, a short TTI, an sTTI, a minislot, etc.) with a shorter TTI duration than the first TTI.

In addition, the control section 301 may generate and transmit information that allows the user terminal 20 to control the transmission power of the first signal transmitted in the first TTI and the transmission power of a second signal transmitted in a second TTI, which has a shorter TTI duration than the first TTI, and cause the user terminal 20 to execute such control. This information may be, for example, TPC commands and/or the like, and may be reported via DCI, higher layer signaling and so on.

If the total transmission power of the first signal and the second signal transmitted in an overlapping manner exceeds the maximum transmission power, the control section 301 may exert control so that information related to predetermined rules (for example, at least one of priority rules 1 to 5 described with the first embodiment), which the user terminal 20 uses to preferentially assign transmission power to one of the first signal and the second signal, is transmitted to the user terminal 20.

The control section 301 may exert control for receiving PHRs including PHs related to long TTIs and/or short TTIs. The control section 301 may trigger the user terminal 20 to report PHRs for predetermined long TTIs and/or short TTIs.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, in compliance with DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/ receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), the signal strength (for example, RSSI (Received Signal Strength Indicator)), trans mission path information (for example, CSI), and so on. The measurement results may be output to the control section 301.

(User Terminal)

Figure 11:
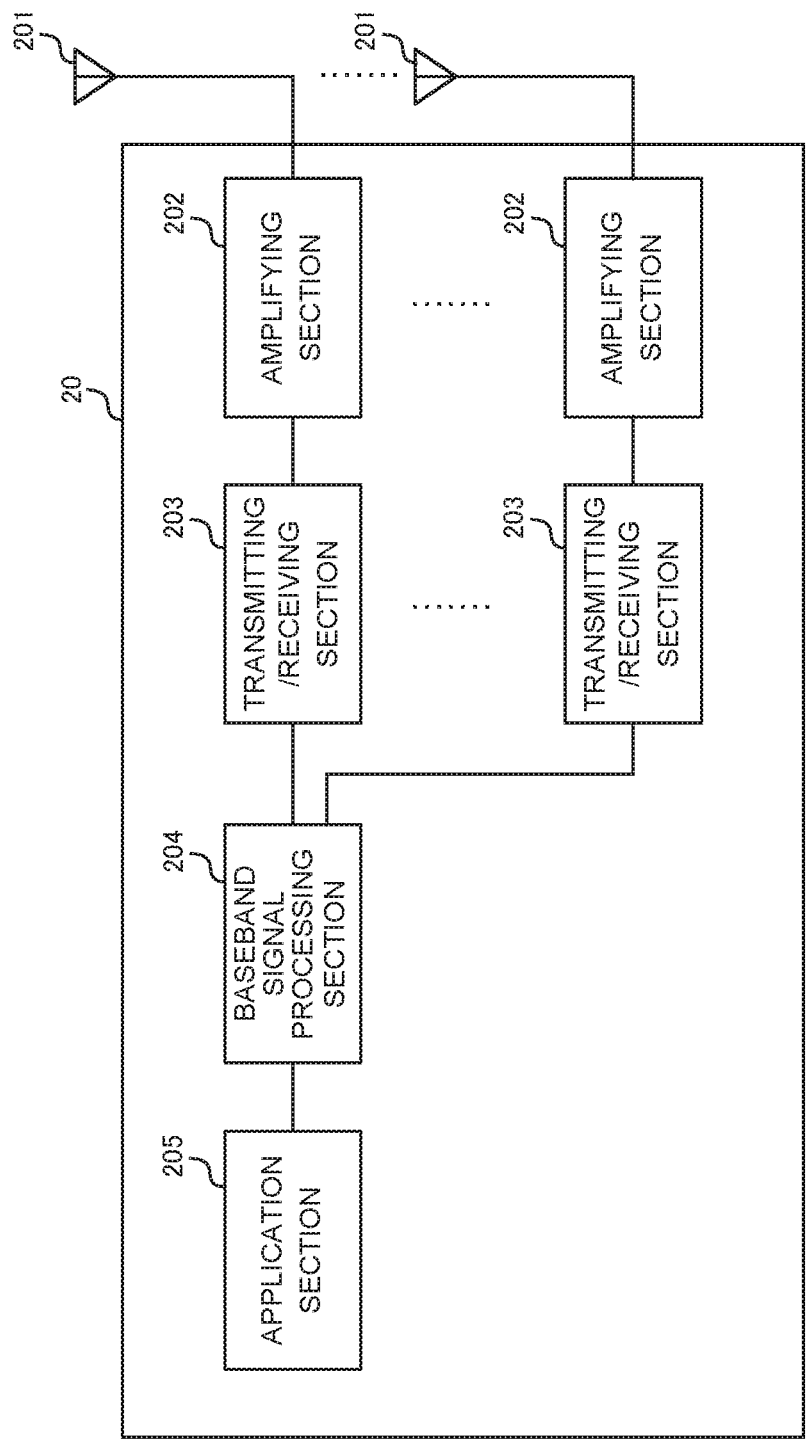
FIG. 11 is a diagram to show an example of an overall structure of a user terminal according to one embodiment of the present invention.

FIG. 11 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs receiving processes for the baseband signal that is input, including an FFT process, error correction decoding, a retransmission control receiving process and so on. Downlink user data is forwarded to the application section 205. The application section 205 performs processes related to higher layers above the physical layer and the MAC layer, and so on. In the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

The transmitting/receiving sections 203 may transmit and/or receive signals using multiple TTIs of varying lengths (TTI durations). For example, in one or more carriers (cells, CCs, etc.), the transmitting/receiving sections 203 may transmit signals using a first TTI (for example, a long TTI) and a second TTI (for example, a short TTI) with a shorter TTI duration than the first TTI.

For example, the transmitting/receiving sections 203 transmit uplink signals to the radio base station 10 using the PUCCH, the PUSCH, the sPUCCH, the sPUSCH and/or others. Also, the transmitting/receiving sections 203 transmit power headroom reports (PHRs), which include power headrooms (PHs) relating to one or more long TTIs and short TTIs. The transmitting/receiving sections 203 may receive at least one of information related to priority rules, information related to the minimum guaranteed power of predetermined TTIs, information related to PHR calculation, and information related to PHR transmission timing, from the radio base station 10.

Figure 12:
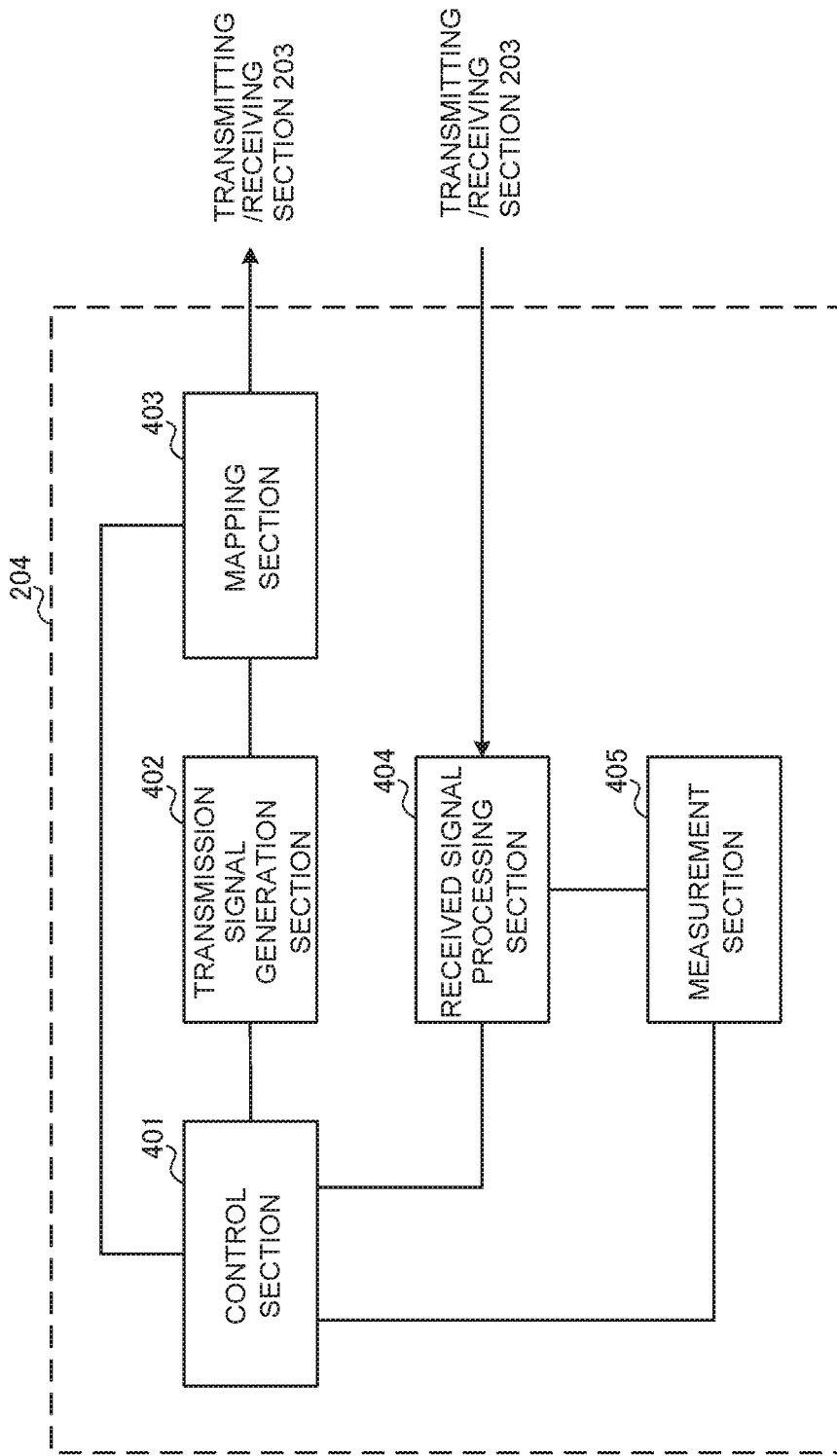
FIG. 12 is a diagram to show an example of a functional structure of a user terminal according to one embodiment of the present invention.

FIG. 12 is a diagram to show an example of a functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

In one or more CCs, the control section 401 controls the transmission and/or reception of signals using a first TTI (for example, a long TTI, a subframe, a slot, etc.) and a second TTI (for example, a short TTI, an sTTI, a minislot, etc.) having a shorter TTI duration than the first TTI.

Furthermore, the control section 401 controls the transmission power of the first signal transmitted in the first TTI and the transmission power of a second signal transmitted in a second TTI, which has a shorter TTI duration than the first TTI The first signal may be, for example, the PUSCH, the PUCCH, etc. The second signal may be the sPUSCH, sPUCCH, etc.

If the total transmission power of the first signal and the second signal transmitted in an overlapping manner exceeds the maximum transmission power, the control section 401 may exert control so that transmission power is preferentially allocated to one of the first signal and the second signal following predetermined rules (for example, at least one of priority rules 1 to 5 described with the first embodiment).

For example, if the above total transmission power exceeds the above maximum transmission power, the control section 401 may exert control so that transmission power is preferentially allocated to one of the first signal and the second signal, based on at least one of the TTI duration of the first TTI and the TTI duration of the second TTI.

Also, if the above total transmission power exceeds the above maximum transmission power and the second TTI is started at the same timing or an earlier timing than the first TTI, the control section 401 may exert control so that transmission power is preferentially allocated to the second signal.

Also, if the above total transmission power exceeds the above maximum transmission power, based on the type of the first signal and/or the type of the second signal, the control section 401 may exert control so that transmission power is preferentially allocated to one of the first signal and the second signal. The "type" here may be, for example, the type of the UL transmission signal (the type of the UL transmission signal, the channel, the contents, etc.).

Also, if the total transmission power exceeds the maximum transmission power, based on the minimum guaranteed power for each TTI, the control section 401 may exert control so that transmission power that is equal to or greater than the corresponding minimum guaranteed power (of each TTI) is assigned to the first signal and the second signal. The minimum guaranteed power for each TTI may be configured by higher layer signaling, or may be calculated by the control section 401 using downlink control information.

The control section 401 may judge the method for calculating a PH to be included in a PHR based on the TTI duration that is used to transmit the PHR (whether a real PH of a predetermined channel is included in the PHR, whether a virtual PH is included, and so on).

In this specification, when "transmission power is allocated (reserved) preferentially," this may be rewritten to read "transmission power is allocated without power scaling or dropping," or may be written to read "transmission power that is the same as or as close as possible to the required power is allocated." Also, in this specification, when "the first transmission power (for example, the transmission power of a long TTI) is given priority over second transmission power (for example, the transmission power of a short TTI)," this may be rewritten to read "the first transmission power is allocated preferentially over the second transmission power."

The transmission power of long TTIs and/or the transmission power of short TTIs may be the transmission power of long TTIs and/or the transmission power of short TTIs in one cell (CC), or may be the total transmission power of long TTIs and/or the total transmission power of short TTIs in multiple cells (CCs).

In addition, when various pieces of information reported from the radio base station 10 are acquired from the received signal processing section 404, the control section 401 may update the parameters used for control based on the information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generation apparatus that can be described based on general understanding of the technical field to which the present invention pertains.

For example, the transmission information generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information that is acquired through the receiving processes to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, etc.), the signal strength (for example, RSSI), transmission path information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 13:
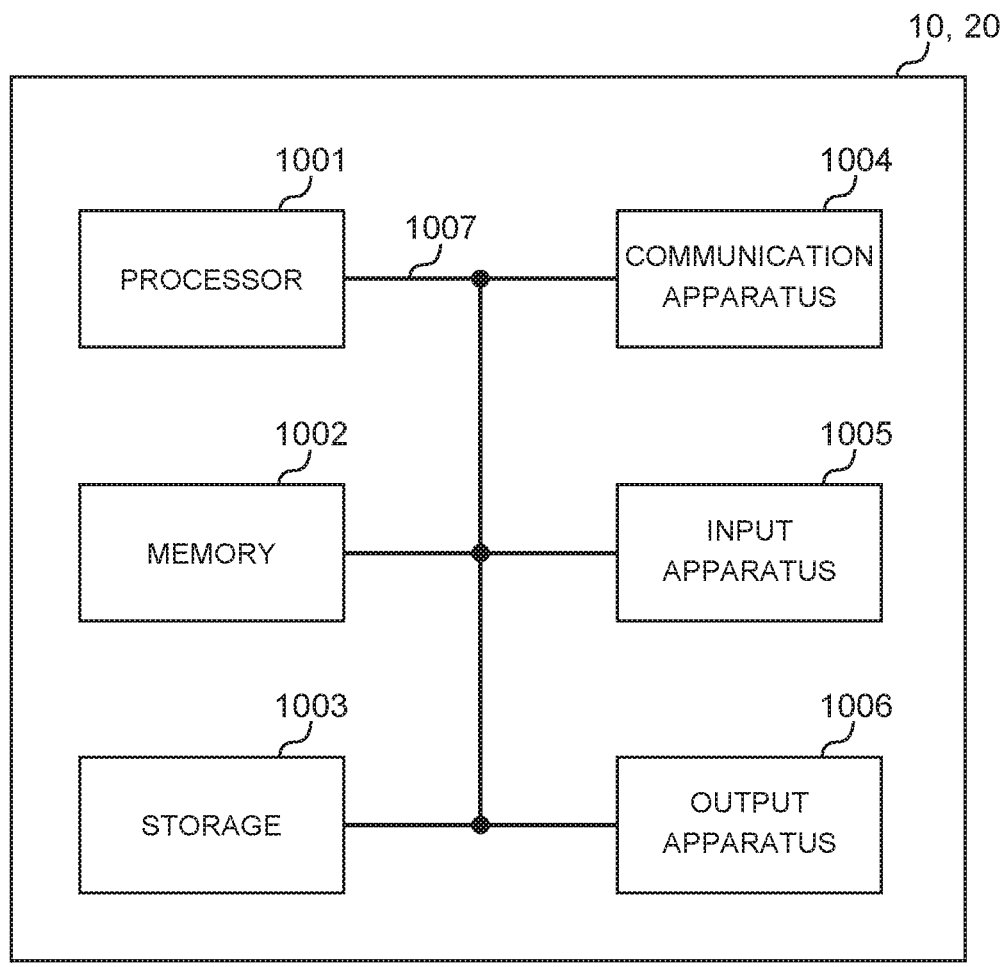
FIG. 13 is a diagram to show an example of a hardware structure of a radio base station and a user terminal according to one embodiment of the present invention.

For example, the radio base station, user terminals and so on according to embodiments of the present invention may function as a computer that executes the processes of the radio communication method of the present invention. FIG. 13 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")". Also, "signals" may be "messages. A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe. Furthermore, a subframe may be comprised of one or more slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of mini slots. Each minislot may consist of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval" (TTI), or a plurality of consecutive subframes may be referred to as a "TTI," or one slot or minislot may be referred to as a "TTI. That is, a subframe and/or a TTI may be a subframe (1 ms) in existing LTE, may be a shorter period than 1 ms (for example, one to thirteen symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the period of time (for example, the number of symbols) in which transport blocks, code blocks and/or codewords are actually mapped may be shorter than the TTI.

Note that, when one slot or one mini slot is referred to as a "TTI," one or more TTIs (that is, one or more slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "minislot," "a subslot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB: Physical RB)," a "subcarrier group (SCG: Sub-Carrier Group)," a "resource element group (REG)," an "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, minislots, symbols and so on described above are merely examples. For example, configurations pertaining to the number of subframes included in a radio frame, the number of slots included in a subframe, the number of minislots included in a slot, the number of symbols and RBs included in a slot or a minislot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PDCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by, using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information" (L1/L2 control signals), "L1 control formation" (L1 control signal) and so on. Also, RRC signaling may be referred to as "RRC messages," and can be, for example, an RRC connection setup message, RRC connection reconfiguration message, and so on. Also, MAC signaling may, be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, terms such as "up" and "down" may be interpreted as "side". For example, an uplink channel may be interpreted as a sidelink channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GQ (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on.

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2017-003665, filed on Jan. 12, 2017, including the specification, drawings and abstract, is incorporated herein by reference in its entirety.

The invention claimed is:

1. A terminal configured to communicate with an other terminal, the terminal comprising:
a processor that determines a power for a transmission using information notified by a first-level sidelink control information including a first scheduling information, the transmission being scheduled by the first-level sidelink control information and a second-level sidelink control information including a second scheduling information; and
a transmitter that performs the transmission to the other terminal via a sidelink channel,
wherein the first-level sidelink control information includes resource allocation information, and
wherein the information notified by the first-level sidelink control information is information specifying a priority of the transmission.

2. The terminal according to claim 1, wherein the first-level sidelink control information is transmitted every slot.

3. The terminal according to claim 1, wherein the transmitter performs the transmission in a shorter time duration than a slot.

4. The terminal according to claim 2, wherein the transmitter performs the transmission in a shorter time duration than a slot.

5. A radio communication method for a terminal configured to communicate with an other terminal, comprising:
determining a power for a transmission using information notified by a first-level sidelink control information including a first scheduling information, the transmission being scheduled by the first-level sidelink control information and a second-level sidelink control information including a second scheduling information; and
performing the transmission to the other terminal via a sidelink channel,
wherein the first-level sidelink control information includes resource allocation information, and
wherein the information notified by the first-level sidelink control information is information specifying a priority of the transmission.

6. A system comprising:
a terminal configured to communicate with an other terminal, the terminal comprising:
a processor that determines a power for a transmission using information notified by a first-level sidelink control information including a first scheduling information, the transmission being scheduled by the first-level sidelink control information and a second-level sidelink control information including a second scheduling information; and
a transmitter that performs the transmission to the other terminal via a sidelink channel; and
the other terminal,
wherein the first-level sidelink control information includes resource allocation information, and
wherein the information notified by the first-level sidelink control information is information specifying a priority of the transmission.

7. The terminal according to claim 1, wherein the first-level sidelink control information is notified in a first resource and the second-level sidelink control information is notified in a second resource.

8. The terminal according to claim 1, wherein the first scheduling information includes resource allocation information and the second scheduling information is different from the first scheduling information.

9. The terminal according to claim 7, wherein the first scheduling information includes resource allocation information and the second scheduling information is different from the first scheduling information.

* * * * *